Figure 1:
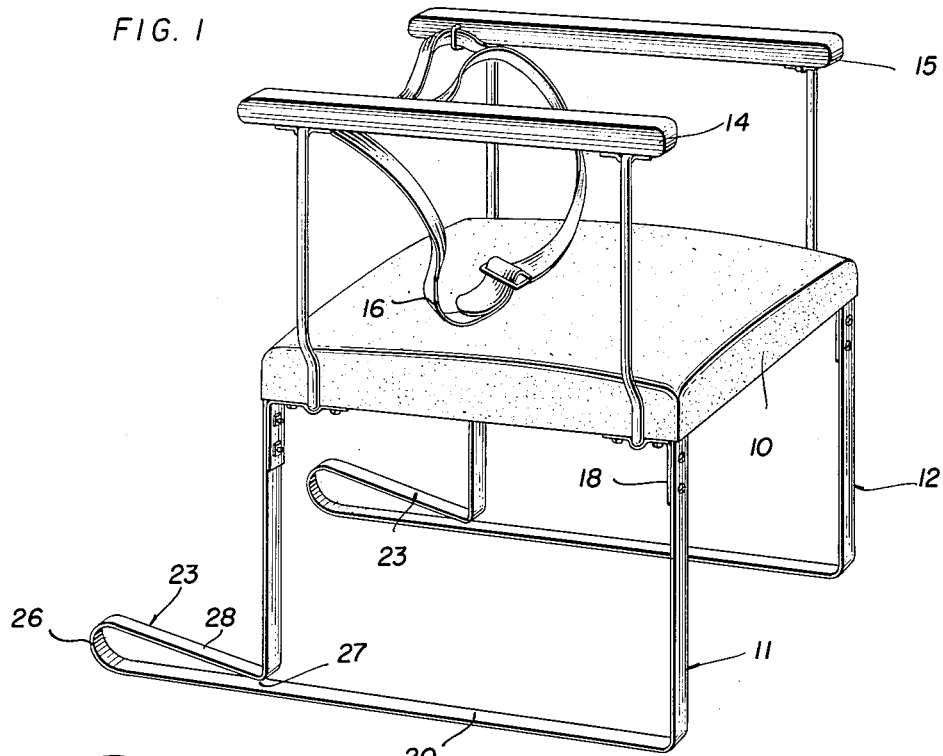

March 27, 1956 A. E. SINGLETON 2,739,641
REMOVABLE AUTO SEAT FOR CHILDREN
Filed Dec. 26, 1951

INVENTOR.
ARTHUR E. SINGLETON
BY Arthur A. Smith
ATTORNEY

United States Patent Office 2,739,641
Patented Mar. 27, 1956

2,739,641

REMOVABLE AUTO SEAT FOR CHILDREN

Arthur E. Singleton, Fort Wayne, Ind., assignor to The Toidey Company, Gertrude A. Muller, Inc., a corporation of Indiana Application December 26, 1951, Serial No. 263,388

4 Claims. (Cl. 155—11)

This invention relates generally to removable auto seats for children and more particularly it relates to an improvement in automobile seats for children which are adapted to be removably mounted on the conventional seat of an automobile.

Conventional automobile seats for children usually comprise an assembly having a seat portion and a base portion adapted to be inserted between the seat cushion of an automobile and the associated back cushion. For removably securing the seat assembly with respect to the automobile seat the base portion usually includes a hook at the rear thereof which is adapted to extend over the rear edge of the seat cushion or the lower and rear edge of the back cushion. These conventional removable seats have been satisfactory until in more recent years it has become customary to equip automobile seats with seat covers. These seat covers usually include a unitary portion which not only covers the automobile cushion but also the back portion of the seat whereby there is no free or empty space between the automobile seat cushion and the back cushion. Hence, it is impossible to use a child's auto seat which has a hook projecting either downwardly around the rear edge of the seat cushion or upwardly around the rear edge of the back cushion. Therefore, the only manner in which the conventional child's auto seat can be utilized with modern seat covers is to puncture holes through the seat covers which will permit the hook portions to be inserted through the seat cover itself. Even though this is done there is great difficulty in removing the child's auto seat due to the fact that the hook portion on the base thereof pulls the seat cover out of place and probably mutilates it in the process.

Accordingly, the principal object of this invention is to provide a child's auto seat having a base portion which may be removably attached to an automobile seat having unitary seat covers.

Another object of this invention is to provide a child's auto seat having a base portion which may be removably attached to an automobile seat having unitary seat covers.

Still another object of this invention is to provide a child's auto seat having a base formed to engage the rear portion of an automobile seat cushion and the lower portion of the back cushion of an automobile seat in such manner that the child's auto seat may be removably attached to the automobile seat.

In accordance with this invention there is provided a child's seat adapted to be removably attached to an automobile seat comprising a chair portion and a base portion, said base portion including members adapted to be thrust between the seat cushion of an automobile and the associated back cushion for frictionally engaging the seat cushion and back cushion in such a manner that the child's seat is firmly attached to the automobile seat.

For a better understanding of the invention, together with other and further objects thereof, reference is made to the following description, taken in connection with the accompanying drawings, and its scope will be pointed out in the appended claims.

Figure 2:
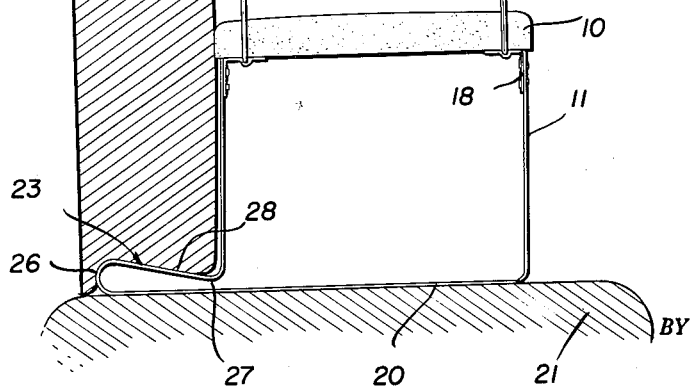

Fig. 1 of the drawings is a perspective view illustrating the child's auto seat constructed in accordance with this invention;

Fig. 2 of the drawings is a side elevational view partially in cross-section illustrating the child's auto seat, shown in Fig. 1, in cooperative relationship with the conventional automobile seat.

Referring to the drawings, there is provided in accordance with this invention a removable child's automobile seat comprising an upholstered seat cushion 10 mounted on a pair of frames 11 and 12 and having arms 14 and 15 to which may be attached a safety belt 16. Frames 11 and 12 may be fastened to the lower side of seat 10 by means of angle irons such for example as 18. Frames 11 and 12 include the vertical post members, as illustrated, together with a base portion 20 which is adapted to rest on the automobile seat cushion 21. The rear extremities of frames 11 and 12 include looped portions 23 which are adapted to be thrust between the surface of seat cushion 21 and the lower surface of back cushion 24. Loop portion 23 is formed to have a relatively wide loop at its outer end 26 for the purpose of deflecting each of the cushions 21 and 24 in the manner illustrated in Fig. 2. The pressure exerted by the two seat cushions on loop 23, plus the fact that the inner end 27 of the loop is pinched together whereby there is an inclined surface 28, provides a holding action so that the seat assembly cannot become disengaged from the cushions when the automobile decelerates rapidly due to braking action. In order to remove the seat assembly from the cushion it is necessary to exert substantial amount of pulling force whereby an adequate safety factor is provided.

From the foregoing description it will be apparent that there is provided in accordance with this invention a child's automobile seat which may be readily mounted on an automobile seat even though that seat may be provided with a seat cover having a unitary member covering both the seat cushion 21 and the back cushion 24 and folded between the lower portion of cushion 24 and the upper surface of cushion 21. Thus, the loop portion 23 may be thrust backwardly into the fold of the seat cover and may also be withdrawn from its inner position without unduly disturbing the seat cover. Furthermore, it is not necessary to mutilate the seat cover by punching holes therein.

While there has been described what is at present considered the preferred embodiment of the invention, it will be obvious to those skilled in the art that various changes and modifications may be made therein without departing from the invention, and it is therefore, aimed in the appended claims to cover all such changes and modifications as fall within the true spirit and scope of the invention.

I claim:

1. A child's auto seat adapted to be removably attached to an automobile seat comprising a seat member, side arms attached to said seat member, and a frame attached to each side of said seat member and projecting downwardly therefrom, said frame including leg portions attached at the corners of said seat member, and a base connecting front and rear legs, said base comprising a linear portion adapted to bear on the seat cushion of said automobile seat and a loop at the rear end thereof which progressively widens at the distance from said rear end and increases so as to engage and compress the lower side of the back cushion of said automobile seat whereby said seat assembly may be thrust backwardly on an automobile seat to engage said loop with said back cushion and the rear edge of said seat member may engage the back of said child's auto automobile seat thereby to form the back of said seat.

2. A child's auto seat adapted to be removably attached to an automobile seat comprising a seat member, and a frame attached to each side of said seat member and projecting downwardly therefrom, said frame including leg portions attached at the corners of said seat member, a base connected to said legs, and a loop at the rear end of said base and comprising an inclined plane portion adapted to engage and compress the lower side of the back cushion of said automobile seat whereby said seat assembly may be thrust backwardly on an automobile seat to engage said loop with said back cushion, said loop being larger in its rearmost portion.

3. A child's auto seat adapted to be removably attached to an automobile seat comprising a seat member, and a frame attached to each side of said seat member and projecting downwardly therefrom, said frame being comprised of two metallic straps, each strap having spaced upright front and rear portions secured at the upper ends thereof to spaced portions, respectively, on said seat member, said leg portions being joined by a base portion which extends from the lower extremity of the front leg portion to a predetermined distance to the rear of the seat member where it is bent into a reflex curve to provide a cushion compressing loop and to join the bottom of the rear leg portion, said loop having a tapered form with the widest dimension thereof disposed rearwardly.

4. A child's auto seat adapted to be removably attached to an automobile seat comprising a supporting member, and a frame attached to opposite sides of said supporting member and projecting downwardly therefrom, said frame being composed of two metallic straps, each strap having two spaced upright leg portions secured at the upper ends thereof to spaced portions, respectively, on said supporting member, said leg portions being joined by a base portion which extends from the lower extremity of one leg portion to the lower extremity of the other leg portion, and a cushion compressing loop on one frame extending rearwardly of said supporting member, said loop having a tapered form with the widest dimension thereof disposed rearwardly.

References Cited in the file of this patent

UNITED STATES PATENTS

| | | |
|---|---|---|
| 1,747,831 | Hess | Feb. 18, 1930 |
| 1,777,463 | Dearing | Oct. 7, 1930 |
| 2,040,463 | Brueckl | May 12, 1936 |
| 2,276,857 | Muller | Mar. 17, 1942 |
| 2,365,003 | Reinholz | Dec. 12, 1944 |
| 2,505,463 | Crane | Apr. 25, 1950 |
| 2,642,923 | Roeder | June 23, 1953 |